US009319981B2

(12) United States Patent
Davidson et al.

(10) Patent No.: US 9,319,981 B2
(45) Date of Patent: Apr. 19, 2016

(54) APPARATUS, SYSTEM AND METHOD OF CONTROLLING A WIRELESS DOCKING DEVICE

(71) Applicant: Intel IP Corporation, Santa Clara, CA (US)

(72) Inventors: Tal Davidson, Holon (IL); Paz Pentelka, Netanya (IL); Avishai Eshet, Tel-Aviv (IL); Tiferet Kronfeld, Shoham (IL); Yoav Gal, Einat (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/227,395

(22) Filed: Mar. 27, 2014

(65) Prior Publication Data
US 2015/0282073 A1 Oct. 1, 2015

(51) Int. Cl.
*H04B 7/00* (2006.01)
*H04W 52/02* (2009.01)
*H04W 4/00* (2009.01)
*H04B 1/00* (2006.01)
*H04W 84/20* (2009.01)

(52) U.S. Cl.
CPC .......... *H04W 52/0209* (2013.01); *H04W 4/008* (2013.01); *H04W 84/20* (2013.01)

(58) Field of Classification Search
CPC ........................... H04W 84/18; H04M 1/7253
USPC ..................... 455/41.2–41.3, 569.1
See application file for complete search history.

(56) References Cited

U.S. PATENT DOCUMENTS

2014/0280450 A1* 9/2014 Luna ............................. 709/202
2015/0011160 A1* 1/2015 Jurgovan et al. ............. 455/41.1

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wi-Fi Alliance Technical Committee P2P Task Group; Wi-Fi Peer-to-Peer (P2P) Technical Specification; Version 1.2; Dec. 14, 2011; 160 pages.
Wireless Gigabit Alliance (WGA) Specifications; WiGig MAC and PHY Specification Version 1.1, Apr. 2011—Final Specification; 442 pages.
Dell; Dell Wireless Dock D5000; User Manual; Version 1.0; Feb. 2013, 52 pages.

* cited by examiner

*Primary Examiner* — Lee Nguyen
(74) *Attorney, Agent, or Firm* — Shichrur & Co.

(57) ABSTRACT

Some demonstrative embodiments include an apparatus, method and/or system of controlling a wireless docking device. For example, a wireless docking interface may include an indicator to indicate at least a wireless docking disconnected state of a wireless docking device, a ready to connect state, and a wireless docking connected state; a control button; and a controller to trigger a wireless docking operation based on a change in a button state of the control button, the wireless docking operation including an operation selected from the group consisting of pairing the wireless docking device with a mobile device, disconnecting the mobile device from the docking device, and triggering the mobile device to switch between first and second power states.

25 Claims, 3 Drawing Sheets

APPARATUS, SYSTEM AND METHOD OF CONTROLLING A WIRELESS DOCKING DEVICE

TECHNICAL FIELD

Embodiments described herein generally relate to controlling a wireless docking device.

BACKGROUND

Mobile devices are becoming smaller and smaller, and typically have decreasingly smaller screens and less Input/Output (IO) ports from generation to generation.

Docking stations are commonly used nowadays to extend the IO port array of the mobile devices, and provide a convenient means for a mobile device to hook up to a static variety of peripheral devices ("peripherals"), such as displays, monitors, external storage devices, external Hard Disk Drives (HDD), a mouse, keyboards, webcams, communication devices, and the like.

A docking device (also referred to as "docking station") may typically be placed on a table, while being permanently connected to the peripherals, and a user of the mobile device may connect the mobile device to the docking station ("dock") to utilize the peripherals.

A wireless docking device is a docking device, in which the user may connect the mobile device to the wireless docking device in a wireless manner.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
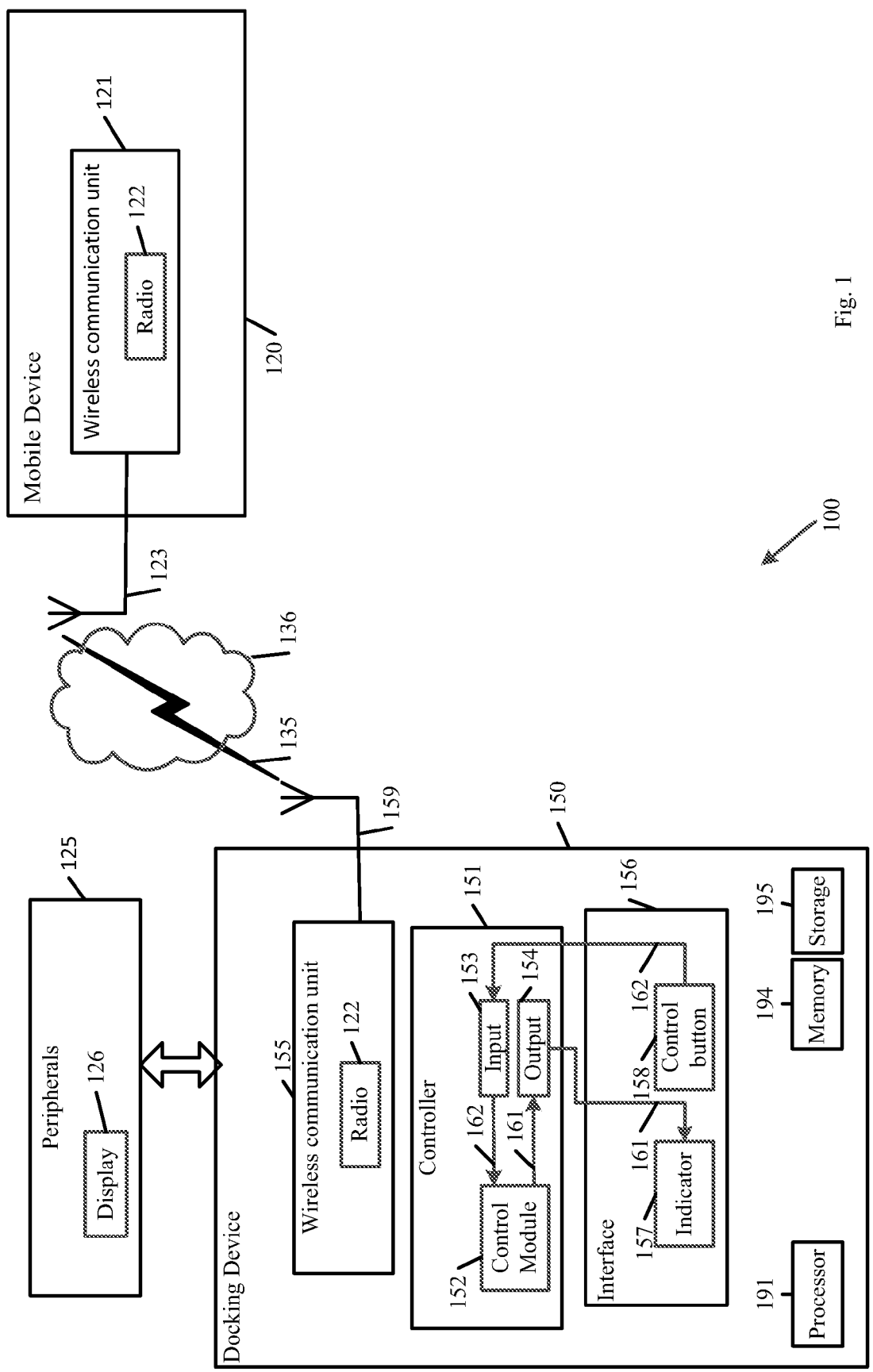
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a docking device, a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11*: Wireless LAN Medium Access Control (MAC) and Physical Layer (PHY) Specifications,* Mar. 29, 2012; *IEEE*802.11 *task group ac (TGac)* (*"IEEE*802.11-09/0308*r*12*—TGac Channel Model Addendum Document"*); IEEE 802.11 task group ad (*TGad*) (*IEEE P*802.11*ad*-2012*, IEEE Standard for Information Technology—Telecommunications and Information Exchange Between Systems—Local and Metropolitan Area Networks—Specific Requirements—Part* 11*: Wireless LAN Medium Access Control (MAC) and Physical Layer (PHY) Specifications—Amendment* 3*: Enhancements for Very High Throughput in the* 60 *GHz Band,* 28 Dec. 2012)) and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification version* 1.2, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "downloading" as used herein with respect to an element includes sending the element and/or receiving the element. For example, a device, which is capable of downloading software and/or firmware, may send the software and/or firmware to at least one other device, and/or may receive the software and/or firmware from at least one other device. The verb downloading may be used to refer to the action of sending or the action of receiving. In one example, the phrase "downloading firmware" may refer to the action of sending the firmware by a first device, and may not necessarily include the action of receiving the firmware by a second device. In another example, the phrase "downloading firmware" may refer to the action of receiving the firmware by a first device, and may not necessarily include the action of sending the firmware by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "powering down" and "power down" as used herein with relation to a device and/or a component may refer, for example, to reducing, diminishing, shutting down, powering off, turning off and/or switching off the electrical current to the device and/or component, and/or to switching the device and/or component to operate at a sleep mode, a reduced-power mode, a stand-by mode and/or any other operation mode which consumes less power than required for full and/or normal operation of the device and/or component.

The phrases "powering up" and "power up" as used herein with relation to a device and/or a component may refer, for example, to enhancing, resuming, turning on and/or switching on the electrical current to the device and/or component and/or to changing the device and/or component from sleep mode, stand by mode or any other operation mode, which consumes less power than required for full reception and/or normal operation of the device and/or component, to operational mode.

The phrases "power save", "power-save state" and "idle power state", as used herein, may refer, for example, to a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

The phrases "active" and "active state", as used herein, may refer, for example, to an operational mode, which enables full and/or normal operation of the device and/or component, e.g., full reception, handling, decoding, transmitting and/or processing of wireless communication signals.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 136. For example, system 100 may include a mobile device 120 (also referred to as "client device") and a wireless docking device 150 (also referred to as "docking station" or "Dock").

In some demonstrative embodiments, wireless medium 136 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, mobile device 120 and/or wireless docking device 150 may include one or more wireless communication units to perform wireless communication between mobile device 120, wireless docking device 150, and/or one or more other wireless communication devices. For example, mobile device 120 may include a wireless communication unit 121, and/or wireless docking device 150 may include a wireless communication unit 155.

In some demonstrative embodiments, wireless communication units 155, and/or 121 may include one or more radios 122, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 155, and/or 121 may include or may be implemented as part of a wireless Network Interface Card (NIC), and the like.

In some demonstrative embodiments, wireless communication units 155 and 121 may be configured to establish a wireless communication link 135 between mobile device 120 and wireless docking device 150 over WM 136 to connect between mobile device 120 and wireless docking device 150.

In some demonstrative embodiments, wireless communication link 135 may include a millimeter-wave (mmwave) wireless communication link.

In some demonstrative embodiments, wireless communication link 135 may include a peer-to-peer (P2P) communication link.

In some demonstrative embodiments, wireless communication link 135 may include a WiFi link.

In other embodiments, wireless communication link 135 may include any other wireless communication link.

In some demonstrative embodiments, wireless communication units 121, and/or 155 may include, or may be associated with, one or more antennas. For example, wireless communication unit 121 may be associated with one or more antennas 123, and/or wireless communication unit 155 may be associated with one or more antennas 159.

Antennas 123, and/or 159 may include any type of antennas suitable for transmitting and/or receiving wireless communication signals, blocks, frames, transmission streams, packets, messages and/or data. For example, antennas 123, and/or 159 may include any suitable configuration, structure and/or arrangement of one or more antenna elements, components, units, assemblies and/or arrays. Antennas 123, and/or 159 may include, for example, antennas suitable for directional communication, e.g., using beamforming techniques. For example, antennas 123, and/or 159 may include a phased array antenna, a multiple element antenna, a set of switched beam antennas, and/or the like. In some embodiments, antennas 123, and/or 159 may implement transmit and receive functionalities using separate transmit and receive antenna elements. In some embodiments, antennas 123, and/or 159 may implement transmit and receive functionalities using common and/or integrated transmit/receive elements.

In some demonstrative embodiments, wireless docking device 150 may also include, for example, a processor 191, and/or a memory unit 194. Wireless docking device 150 may optionally include other suitable hardware components and/or software components. In some demonstrative embodiments, some or all of the components of wireless docking device 150 may be enclosed in a common housing or packaging, and may be interconnected or operably associated using one or more wired or wireless links. In other embodiments, components of wireless docking device 150 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of wireless docking device 150 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. For example, memory unit 194, for example, may store data processed by wireless docking device 150.

In some demonstrative embodiments, mobile device 120 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, wireless docking device 150 may be connected to, may include, or may be implemented as part of, one or more peripherals 125.

In some demonstrative embodiments, peripherals 125 may include a display 126. For example, display 126 may include a touch-screen, a monitor, a screen, a flat panel display, a Light Emitting Diode (LED) display unit, a Liquid Crystal Display (LCD) display unit, a plasma display unit, Cathode Ray Tube (CRT) display unit, and/or any other screen or display.

In some demonstrative embodiments, peripherals 125 may include one or more devices, in addition to or instead of display 126, for example, a keyboard, a mouse, one or more loudspeakers, a Universal Serial Bus (USB) hub, an external storage, and/or any other peripheral device.

In some demonstrative embodiments, peripherals 125 may be implemented as part of wireless docking device 150. For example, wireless docking device 150 may be embedded as part of display 126.

In other embodiments, peripherals 125 may be implemented as a separate element, which may be connected to wireless docking device 150 via a wired or wireless connection. For example, wireless docking device 150 may include a wireless docking station, which may be connected to display 126.

In some demonstrative embodiments, wireless docking device 150 may be configured to provide one or more functionalities to a mobile device, e.g., mobile device 120, in a wireless manner. For example, wireless docking device 150 may enable mobile device 120 to connect to peripherals 125, and to use one or more functionalities associated with peripherals 125 in a wireless manner.

In one example, wireless docking device 150 may enable a user of mobile device 120 to view video content from mobile device 120 on display 126. For example, mobile device 120 may include a Smartphone, and wireless docking device 150 may connect the Smartphone to display 126, for example, to enable the user of mobile device 120 to watch a video, which may be stored by the Smartphone, on display 126.

In another example, mobile device 120 may include a Smartphone, and peripherals 125 may include a keyboard, and a mouse. According to this example, wireless docking device 150 may connect the Smartphone to keyboard and/or mouse, for example, to enable the user of mobile device 120 to edit a file, which may be displayed on display 126, using the keyboard and/or the mouse.

In some demonstrative embodiments, an interaction between wireless docking device 150 and a user of wireless docking device 150, e.g., the user of mobile device 120, which may connect mobile device 120 to wireless docking device 150, may be different from an interaction between a conventional wired docking device and a user of the wired docking station.

In some demonstrative embodiments, a user experience of the user of wireless docking device 150 may be different from a user experience of the user of the conventional wired docking station.

In one example, connecting a mobile device to a wired docking station may include physically attaching the mobile device to the wired docking station, e.g., by physically attaching the mobile device to a cradle of the wired docking station, or by physically connecting the mobile device to the wired docking station via a cable. Similarly, disconnecting the mobile device from the wired docking station may include physically detaching the mobile device from the wired docking station, e.g., by physically detaching the mobile device from the cradle of the wired docking station, or by physically detaching the mobile device from the cable. Accordingly, the user of the wired docking station may be able to determine a connection state between the mobile device and the wired docking station, e.g., whether the mobile device is connected to the wired docking station or disconnected from the wired docking station, by a simple visual inspection to detect whether or not the mobile device is physically attached to the wired docking station.

In contrast to the physical connection and/or attachment between the mobile device and the wired docking device, wireless docking device 150 may wirelessly connect to mobile device 120 via wireless communication link 135. Accordingly, there may be no physical attachment or connection between wireless docking device 150 and mobile device 120, which may enable the user of wireless docking device 150 to visually determine whether or not wireless docking device 150 is connected to mobile device 120.

In another example, an initial association between the mobile device and a wired docking station may be performed by physically connecting the mobile device to the wired docking station.

In contrast to the physical association between the mobile device and the wired docking station, a pairing operation may be performed between wireless docking device 150 and mobile device 120. The pairing operation may be configured to enable associating a first particular wireless device, e.g., wireless docking device 150, with a second particular wireless device, e.g., mobile device 120, in a wireless manner.

In one example, the pairing between docking device 150 and mobile device 120 may include pairing according to a Wireless Protected Setup (WPS) protocol. In another example, the pairing between docking device 150 and mobile device 120 may include pairing a Pre-Shared-Key (PSK) passphrase pairing or any other pairing method or protocol.

In some demonstrative embodiments, the pairing between mobile device 120 and wireless docking device 150 may require the user of mobile device 120 to perform one or more predefined operations on wireless docking device 150 and/or on mobile device 120.

In one example, the user of mobile device 120 may enter a unique Personal Identification Number (PIN) or a predefined pass-phrase to mobile device 120 to pair between mobile device 120 and wireless docking device 150.

In another example, wireless docking device 150 may be configured to support a push-button pairing, in which the user of mobile device 120 may push a button on both wireless docking device 150 and mobile device 120, e.g., as described below.

In another example, the pairing between wireless docking device 150 and mobile device 120 may include any other pairing method.

In some demonstrative embodiments, docking device 150 may include an interface 156 to interface between wireless docking device 150 and the user of mobile device 120, e.g., as described below.

In some demonstrative embodiments, interface 156 may be configured to provide a comprehensive, enhanced and/or intuitive user experience to the user of mobile device 120, when using wireless docking device 150, e.g., as described below.

In some demonstrative embodiments, interface 156 may be configured to enable the user of mobile device 120 to perform one or more docking operations, and to receive an indication of one or more docking states of wireless docking device 150, e.g., as described below.

In some demonstrative embodiments, interface 156 may be configured to indicate a plurality of predefined states of wireless docking device 150, and/or to trigger a predefined plurality of wireless docking operations 150, e.g., as described below.

In some demonstrative embodiments, interface 156 may be configured to initiate and indicate a pairing operation to pair between mobile device 120 and wireless docking device 150, e.g., as described below.

In some demonstrative embodiments, interface 156 may be configured to initiate and indicate a wireless docking connection operation to connect between mobile device 120 and wireless docking device 150, e.g., as described below.

In some demonstrative embodiments, interface 156 may be configured to initiate and indicate a wireless docking disconnect operation to disconnect mobile device 120 from wireless docking device 150.

In some demonstrative embodiments, interface 156 be configured to enable the user of mobile device 120 trigger mobile device 120 to enter a power-save (idle) state, and/or to trigger mobile device 120 to switch from the power-save state to an active state, e.g., as described below.

In some demonstrative embodiments, interface 156 may be configured to enable the user of mobile device 120 to trigger wireless docking device 150 to perform one or more docking operations, for example, in a manner which may enhance a user experience of the user. In one example, interface 156 may be configured to enable the user of mobile device 120 to trigger wireless docking device 150 to perform the one or more docking operations, for example, using interface 156, e.g., instead of performing one or more operations on mobile device 120.

In some demonstrative embodiments, mobile device 120 may have a lid, which may be movable between an open state and a close state. In one example, mobile device 120 may have a clamshell-type configuration, e.g., including a lid, which may be rotatable with respect top a base.

In some demonstrative embodiments, mobile device 120 may operate at a power-save state, for example, if mobile device 120 is at an operational mode, which consumes less power than required for the full and/or the normal operation of mobile device 120. For example, mobile device 120 may switch to the power-save state, for example, if mobile device 120 is not being used for a relatively long period of time.

In some demonstrative embodiments, mobile device 120 may operate at an active state, for example, if mobile device 120 is at the operational mode, which enables a full and/or normal operation of mobile device 120 by the user of mobile device 120. For example, mobile device 120 may be at the active state, for example, if mobile device 120 is being used by the user of mobile device 120.

In some demonstrative embodiments, requiring the user of mobile device 120 to open the lid of mobile device 120 in order to perform one or more operations, may compromise the user experience of the user of mobile device 120. For example, the user experience of the user of mobile device 120 may be compromised, if the user is required to open the lid of mobile device, for example, in order to be able to control mobile device 120 to connect to wireless docking device 150, to disconnect from wireless docking device 150, to switch between first and second power states of mobile device 120, and/or to perform one or more other operations.

In some demonstrative embodiments, interface 156 may be configured to support a "closed-lid" user experience for the user of mobile device 120, e.g., as described below.

In some demonstrative embodiments, interface 156 may be configured to visually indicate a docking state of wireless docking station 150 and/or to enable the user of mobile device 120 to trigger one or more docking operations via wireless docking device 150, for example, without requiring the user of mobile device 120 to perform one or more operations directly on mobile device 120, and/or without requiring the user to open the lid of mobile device 120.

In some demonstrative embodiments, interface 156 may be configured to visually indicate to the user of mobile device 120, whether wireless docking device 150 is at a connected state or at a disconnected state, for example, without requiring the user to open the lid of mobile device 120 and/or to perform one or more other operations on mobile device 120.

In some demonstrative embodiments, interface 156 may be configured to enable the user of mobile device 120 to trigger wireless docking device 150 to perform one or more docking operations, for example, without requiring the user to perform one or more operations on mobile device 120, e.g., as described below.

In some demonstrative embodiments, interface 156 may be configured to enable the user of mobile device 120 to trigger wireless docking device 150 to perform one or more docking operations, for example, even while a lid of mobile device 120 is closed.

In some demonstrative embodiments, wireless docking device 150 may be configured to request mobile device 120 to switch between the first and second power states, for example, even if the lid of mobile device 102 is closed. In one example, wireless docking device 150 may be configured to request mobile device 120 to switch from the active state to the power-save state, or to switch from the power save state to the active state, e.g., as described below. In one example, wireless docking device 150 may send to mobile device a message, e.g., a power-up message or a sleep message, indicting the request to switch between the first and second power states.

In some demonstrative embodiments, interface 156 may include at least one indicator 157 to indicate, e.g., to the user of mobile device 120, a docking state of wireless docking device 150, e.g., as described below.

In some demonstrative embodiments, interface 156 may include at least one control button 158 to enable the user to trigger one or more docking operations to be performed by wireless docking device 150, e.g., as described below.

In some demonstrative embodiments, one or more elements of interface 156 may be implemented as a one or more physical interface elements.

In one example, indicator 157 may include a physical indicator and/or control button 158 may include a physical control button, e.g., as described below.

In other embodiments, one or more elements of interface 156 may be implemented as one or more virtual interface elements.

In one example, interface 156 may be implemented as part of a Graphical User Interface (GUI) on display 126, e.g., as an On-Screen Display (OSD). For example, indicator 157 may be implemented as a virtual indicator displayed on display 126 and/or control button 158 may be implemented by a virtual control button, which may be displayed on display 126.

In some demonstrative embodiments, indicator 157 may be configured to indicate at least three docking states of wireless docking device 150. For example, indicator 157 may be configured to indicate at least a wireless docking connected state, a wireless docking disconnected state, and a ready to connect state, e.g., as described below.

In some demonstrative embodiments, indicator 157 may be configured to indicate five docking states of wireless docking device 150. For example, indicator 157 may be configured to indicate the wireless docking connected state, the wireless docking disconnected state, the ready to connect state, an error state, and an upgrading state, e.g., as described below.

In other embodiments, indicator 157 may be configured to indicate any other additional and/or alternative wireless docking states of wireless docking device 150.

In other embodiments, indicator 157 may be configured to indicate any other number of states, e.g., less than three states and/or more than five states.

In some demonstrative embodiments, indicator 157 may be configured to indicate a wireless docking connected state of wireless docking device 150. For example, docking device 150 may be at the connected state, when docking device 150 is wirelessly connected to mobile device 120, e.g., to enable mobile device 120 access to peripherals 125. For example, wireless docking device 150 and mobile device 120 may connect to each other by establishing wireless communication link 135 between wireless docking device 150 and mobile device 120.

In some demonstrative embodiments, indicator 157 may be configured to indicate a wireless docking disconnected state of docking device 150.

In some demonstrative embodiments, wireless docking device 150 may be at the disconnected state, for example, when wireless docking device 150 is not connected to mobile device 120 via a wireless communication link. For example, wireless docking device 150 may be at the disconnected state prior to establishment of wireless communication link 135 with mobile device, or upon disconnection of a previously established wireless communication link 135 with mobile device 120.

In some demonstrative embodiments, indicator 157 may be configured to indicate the wireless docking connected state and/or the wireless docking disconnected state of docking device 150, for example, to provide a sensible or perceivable representation, e.g., a visual representation, of the connected state and/or disconnected state of wireless docking device 150.

In some demonstrative embodiments, indicator 157 may be configured to indicate one or more additional states of a wireless docking device 150, e.g., which may not require a physical interaction between wireless docking device 150 and mobile device 120 and, accordingly may not be visual to the user.

In some demonstrative embodiments, indicator 157 may be configured to indicate a ready to connect state of wireless docking device 150.

In some demonstrative embodiments, wireless docking device 150 may be at the ready to connect state, for example, when wireless docking device 150 is not yet connected to mobile device 120, and wireless docking device 150 is capable of establishing a connection with mobile device 120. In one example, wireless docking device 150 may be at the ready to connect state, for example, if pressing control button 158 will trigger a wireless docking connection, e.g., as described below.

For example, wireless docking device 150 may be at the ready to connect state, when wireless docking device 150 is not be connected to mobile device 120, and mobile device 120 is within a sensing range of wireless docking device 150, e.g., when mobile device 120 is at the power-save state. In one example, wireless docking device 150 may be at the ready to connect state, when mobile device 120 is at a distance from docking device 150, which may enable docking device 150 to sense mobile device 120, and to connect to mobile device 120.

In another example, wireless docking device 150 may be at the ready to connect state, during a pairing between wireless docking device 150 and mobile device 120, for example, during a WPS push-button pairing, e.g., as described above.

In some demonstrative embodiments, indicator 157 may be configured to indicate an error state of wireless docking device 150. For example, wireless docking device 150 may be at the error state, when docking device 150 experiences a hardware and/or a firmware failure.

In some demonstrative embodiments, indicator 157 may be configured to indicate an upgrading state of wireless docking device 150. For example, during the upgrading state wireless docking device 150 may download and/or process a firmware upgrade of wireless docking device 150.

In some demonstrative embodiments, indicator 157 may be configured to provide a visual representation indicating the wireless docking state of wireless docking device 150.

In some demonstrative embodiments, indicator 157 may include at least one light source to generate light of a plurality of predefined colors and/or patterns representing a respective plurality of wireless docking states of wireless docking device 150, e.g., as described below.

In other embodiments, indicator 157 may be configured to generate any other types of indications, e.g., visual indications, audio indications and/or any other sensible or perceivable indications, corresponding to one or more wireless docking states of wireless docking device 150.

In some demonstrative embodiments, indicator 157 may include a multi-color light source configured to generate light of a plurality of colors, e.g., as described below. In other embodiments, indicator 157 may include a plurality of light sources to generate light of a plurality of colors.

In some demonstrative embodiments, indicator 157 may include a multi-color Light Emitting Diode (LED). In other embodiments, indicator 157 may include any one or more other light sources.

In some demonstrative embodiments, indicator 157 may include a three-color light source configured to generate light of three colors. In other embodiments, indicator 157 may include any other multi-color light source, e.g., a two-color light source, a four-color light source, and the like.

In some demonstrative embodiments, indicator 157 may be configured to switch between emitting light of a first color, light of a second color, different from the first color, and light of a third color, different from the first and the second colors.

In some demonstrative embodiments, the light of the first color may include yellow light, the light of the second color may include green light, and/or the light of the third color may include red light. In other embodiments, the light of the first, second and/or third colors may include light of any one or more other colors.

In some other embodiments, indicator 157 may be configured to switch between two or more light emitting patterns of light of at least one particular color of the first, second or third colors. For example, indicator 157 may be configured to switch between emitting the light of the particular color at a first light emitting pattern, e.g., continuously emitting the light of the particular color, and at least a second light emitting patter, e.g., emitting the light of the particular color in an intermittent manner to cause a blinking effect.

In one example, indicator 157 may be configured to switch between a first green light pattern ("green"), e.g., continuously emitting green light, and a second green light patter ("blinking green"), e.g., intermittently emitting green light.

In some demonstrative embodiments, indicator 157 may include a three-color LED, e.g., a red-yellow-green LED, switchable between five indicator states to indicate five respective wireless docking states of wireless docking device 157, e.g., as described below.

In one example, indicator 157 may be switchable between a first indicator state, e.g., at which the three-color LED is switched off, to indicate a first wireless docking state, e.g., the wireless docking disconnected state; a second indicator state, e.g., at which the three-color LED is switched to continuously emit green light, to indicate a second wireless docking state, e.g., the wireless docking connected state; a third indicator state, e.g., at which the three-color LED is switched to continuously emit red light, to indicate a third wireless docking state, e.g., the error state; a fourth indicator state, e.g., at which the three-color LED is switched to continuously emit yellow light, to indicate a fourth wireless docking state, e.g., the ready to connect state; and/or a fifth indicator state, e.g., at which the three-color LED is switched to the blinking green state, to indicate a fifth wireless docking state, e.g., the upgrading state.

In other embodiments, indicator 157 may include any other one or more sensible or perceivable indicators to generate any other plurality of sensible or perceivable indications, e.g., visual or non-visual indications, corresponding to the plurality of wireless docking states of wireless docking device 150.

In some demonstrative embodiments, wireless docking device 150 may include a controller 151 to control an indication state of indicator 157, for example, according to a docking state of wireless docking device 150, e.g. as described below.

In some demonstrative embodiments, controller 151 may be implemented as part of interface 156. In other embodiments, controller 151 may be implemented as any other element of wireless docking device 150.

In some demonstrative embodiments, controller 151 may include a control module 152 configured to control indicator 157, e.g., using a control signal 161. For example, control module controller 151 may include an output 154 to output control signal 161 to indicator 157.

In one example, docking device 150 may be at a first wireless docking state, e.g., the ready to connect state. According to this example, control module 152 may provide to indicator 157, e.g., via output 154, the control signal 161 configured to instruct indicator 157 to indicate the first wireless docking state. Docking device 150 may switch from the first wireless docking state to a second wireless docking state, e.g., the wireless docking connected state. According to this example, control module 152 may provide to indicator 157, e.g., via output 154, the control signal 161 configured to instruct indicator 157 to switch to indicate the second wireless docking state.

In some demonstrative embodiments, control module 152 may control indicator 157 to switch to the first indicator state, e.g., at which the three-color LED is switched off, to indicate the first wireless docking state, e.g., the wireless docking disconnected state; the second indicator state, e.g., at which the three-color LED is switched to continuously emit green light, to indicate the second wireless docking state, e.g., the wireless docking connected state; the third indicator state, e.g., at which the three-color LED is switched to continuously emit red light, to indicate the third wireless docking state, e.g., the error state; the fourth indicator state, e.g., at which the three-color LED is switched to continuously emit yellow light, to indicate the fourth wireless docking state, e.g., the ready to connect state; and/or the fifth indicator state, e.g., at which the three-color LED is switched to the blinking green state, to indicate the fifth wireless docking state, e.g., the upgrading state.

In some demonstrative embodiments, control button 158 may be configured to enable the user of mobile device 120 to trigger one or more docking operations by wireless docking device 150, e.g., as described below.

In some demonstrative embodiments, control button 158 may be configured to enable the user of mobile device 120 to trigger wireless docking device 150 to perform one or more docking operations, in a manner which may enhance a user experience of the user, e.g., as described below.

In some demonstrative embodiments, control button 158 may be configured to enable the user of mobile device 120 to trigger wireless docking device 150 to perform one or more docking operations, for example, without requiring the user to perform one or more operations on mobile device 120, e.g., without requiring the user of mobile device to open a lid of mobile device and/or to press one or more buttons on mobile device 120.

In some demonstrative embodiments, control button 158 may include a single control button, e.g., as described below. In other embodiments, control button 158 may be implemented by a plurality of control buttons.

In some demonstrative embodiments, controller 151 may be configured to trigger one or more wireless docking operations, based on a change in a button state of control button 158, e.g., as described below.

In some demonstrative embodiments, controller 151 may include an input 153 to receive, e.g., from control button 158, an input signal 162 indicating the button state of control button 158. For example, control module 152 may be configured to trigger a docking operation based on a change in the button state of control button 158.

In some demonstrative embodiments, control module 152 may be configured to trigger a pairing operation to pair between wireless docking device 150 and mobile device 120, a wireless docking disconnecting operation to disconnect mobile device 120 from wireless docking device 150, a power-state switching operation to switch mobile device 120 between first and second power states, e.g., the power-save state and the active state, and/or one or more other operations, e.g., as described below.

In some demonstrative embodiments, input signal 162 may indicate whether or not control button 158 is being pressed. For example, input signal 162 may have a first value, e.g., zero, when control button 158 is not being pressed, and a second value, e.g., one, when control button 158 is being pressed.

In some demonstrative embodiments, control module 152 may be configured to differentiate between at least first and second durations of pressing control button 158, e.g., based on input signal 162. For example, control module 152 may determine whether control button 158 is being pressed for a first duration or a second duration, e.g., longer than the first duration, for example, based on a duration of input signal 162 having the second value. In one embodiment, the first duration may include a duration up to one second, and/or the second duration may include a duration longer than one second, e.g., two or three seconds. In other embodiments, the first and/or second durations may include any other duration.

In some demonstrative embodiments, control module 152 may be configured to determine a wireless docking operation to be triggered responsive to the change in the button state of control button 158, e.g., as described below.

In some demonstrative embodiments, control module 152 may determine the wireless docking operation to be triggered based on the wireless docking state of wireless docking device 150, when control button 158 is being pressed, and/or based on a duration control button 158 is being pressed, e.g., as described below.

In some demonstrative embodiments, docking device 150 may be at the ready to connect state, for example, if mobile device 120 is in the sensing range of docking device 150.

In some demonstrative embodiments, controller 151 may control indicator 157 to emit light of a first predefined color, e.g., yellow, for example, when docking device 150 is at the ready to connect state.

In some demonstrative embodiments, controller 151 may be configured trigger the pairing between wireless docking device 150 and mobile device 120, for example, responsive to control button 158 being pressed, e.g., by the user of mobile device 120, when docking device 150 is at the ready to connect state, and wireless docking device 150 is not paired with mobile device 120. For example, control module 152 may trigger wireless pairing between wireless docking device and mobile device 120, responsive to receiving input signal 162 indicating that control button 158 is being pressed, e.g., when wireless docking device is at the ready to connect state.

In some demonstrative embodiments, controller 151 may switch wireless docking device 150 from the ready to connect state to the wireless docking connected state, for example, after pairing between wireless docking device 150 and mobile device 120.

In some demonstrative embodiments, controller 151 may control indicator 157 to emit light of a second predefined color, e.g., green, to indicate wireless docking device 150 is at the wireless docking connected state.

In some demonstrative embodiments, controller 151 may be configured to trigger mobile device 120 to switch between the active state and the power-save state, and to switch docking device 150 between the wireless docking connected state to the ready to connect state, for example, responsive to control button 158 being pressed.

In some demonstrative embodiments, controller 151 may be configured to trigger mobile device 120 to switch from the active state to the power-save state, and to switch docking device 150 from the wireless docking connected state to the ready to connect state, for example, responsive to control button 158 being pressed, when wireless docking device 150 is at the wireless docking connected state.

For example, docking device 150 may be at the wireless docking connected state and mobile device 120 may operate at the active state. According to this example, control module 152 may trigger mobile device 120 to switch from the active state to the power-save state, for example, responsive to receiving input signal 162 indicating that control button 158 is being pressed for the first duration, e.g., by the user of mobile device 120. For example, control module 152 may send to mobile device a sleep message to trigger mobile device 120 to switch from the active state to the power-save state. Control module 152 may, for example, control wireless docking device 150 to switch from the wireless docking connected state to the ready to connect state, for example, responsive to receiving input signal 162 indicating that control button 158 is being pressed for the first duration.

In some demonstrative embodiments, controller 151 may be configured to trigger mobile device 120 to switch from the active state to the power-save state, and may switch docking device 150 from the connected state to the ready to connect state, for example, responsive to the user of mobile device 120 pressing control button 158, for example, even if the user of mobile device 120 does not perform one or more operations on mobile device 120.

For example, mobile device 120 may include a laptop. According to this example, controller 151 may trigger the laptop to switch from the active state to the power-save state, and may switch wireless docking station 150 from the connected state to the ready to connect state, for example, even if the user of mobile device 120 does not open a lid of the laptop.

In some demonstrative embodiments, controller 151 may control indicator 157 to emit light of the first color, e.g., yellow, for example, if docking device 150 and mobile device 120 are paired, docking device 150 is at the ready to connect state, and mobile device 120 is at the power-save state.

In some demonstrative embodiments, controller 151 may be configured trigger mobile device 120 to switch from the power-save state to the active state, and to switch wireless docking device 150 from the ready to connect state to the wireless docking connected state, for example, responsive to control button 158 being pressed, for example, when docking device 150 is at the ready to connect state, and docking device 150 and mobile device 120 are paired and configured to auto-connect.

For example, docking device 150 may be at the ready to connect state and mobile device 120 may operate at the power-save state. According to this example, control module 152 may trigger mobile device 120 to switch from the power-save state to the active state, for example, responsive to receiving input signal 162 indicating that control button 158 is being pressed for the first duration, e.g., by the user of mobile device 120. For example, control module 152 may send to mobile device a wake up message to trigger mobile device 120 to switch from the power-save state to the active state. Control module 152 may, for example, control wireless docking device 150 to switch from the ready to connect state to the wireless docking connected state, for example, responsive to receiving input signal 162 indicating that control button 158 is being pressed for the first duration.

In some demonstrative embodiments, controller 151 may trigger mobile device 120 to switch from the power-save state to the active state, and may switch docking device 150 from the ready to connect state to the connected state, for example, even if the user of mobile device 120 does not perform one or more operations on mobile device 120.

For example, mobile device 120 may include a laptop. According to this example, controller 151 may trigger the laptop to switch from the power-save state to the active state, and may switch wireless docking device 150 from the ready to connect state to the connected state, for example, even if the user of mobile device 120 does not open a lid of the laptop.

In some demonstrative embodiments, controller 151 may control indicator 157 to emit light of a second predefined color, e.g. green, for example, when wireless docking device 150 is at the wireless docking connected state.

In some demonstrative embodiments, controller 151 may disconnect docking device 150 from mobile device 120, and may switch docking device 150 from the wireless docking connected state to the wireless docking disconnected state, for example, responsive to control button 158 being pressed when docking device 150 is at the wireless connected state.

For example, docking device 150 may be at the wireless docking connected state, and mobile device 120 may be at the active state. According to this example, control module 152 may disconnect mobile device 120 from wireless docking device 150, and may switch wireless docking device 150 from the wireless docking connected state to the wireless docking disconnected state, for example, responsive to responsive to receiving input signal 162 indicating that control button 158 is being pressed for the second duration, e.g., by the user of mobile device 120.

In some demonstrative embodiments, controller 151 may trigger a display device, e.g., display 126, to display a docking message, for example, responsive to control button 158 being pressed when docking device 150 is at the wireless docking disconnected state.

In some demonstrative embodiments, the docking message may include an information message, which may inform the user of mobile device 120 that docking device 150 is at the wireless docking disconnected state.

For example, wireless docking device 150 may be at the wireless docking disconnected state, and the user of mobile device 120 may press control button 158, e.g., for the first duration. According to this example, control module 152 may trigger display 126 to display the docking message, e.g., "The docking station is at the disconnected state", e.g., responsive to receiving input signal 162 indicating that control button 158 is being pressed.

In some demonstrative embodiments, mapping the docking states of wireless docking device 150 to a plurality of different indications of indicator 157, e.g., as described above, may provide an intuitive and/or enhanced user experience when using docking device 150.

In some demonstrative embodiments, enabling the user of wireless docking device 150 to control the docking operations of docking device 150 using control button 158 may provide an intuitive and enhanced user experience when using docking device 150, for example, without requiring the user to open or close a lid of mobile device 120.

Figure 2:
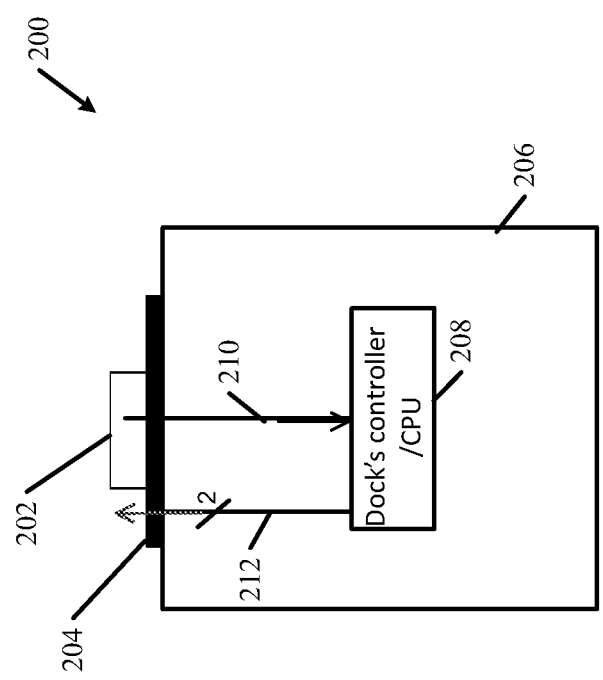
FIG. 2 is a schematic block diagram illustration of a wireless docking user interface, in accordance with some demonstrative embodiments.

Reference is made to FIG. 2, which schematically illustrates a wireless docking user interface 200, in accordance with some demonstrative embodiments. For example, user interface 200 may perform the functionality of interface 156 (FIG. 1).

In some demonstrative embodiments, user interface 200 may include a physical user interface, which may be implemented on an enclosure 206 of a wireless docking device, e.g., wireless docking device 150 (FIG. 1).

In some demonstrative embodiments, user interface 200 may include a single multicolor light source 204. For example, multicolor light source 204 may include a multicolor LED. In one example multicolor light source may include a yellow/red/green LED. Multicolor light source 204 may, for example, perform the functionality of indicator 157 (FIG. 1).

In some demonstrative embodiments, user interface 200 may include a single control button 202. A shown in FIG. 2, in some embodiments, control button 202 may be placed adjacent to, or on top of, multicolor light source 204. In other embodiments, control button 202 and multicolor light source 204 may be arranged in to any other manner.

In some demonstrative embodiments, control button 202 and multicolor light source may be connected to a controller 208, e.g., a controller of the wireless docking device. For example, controller 208 may perform the functionality of controller 151 (FIG. 1).

In some demonstrative embodiments, multicolor light source 204 may be configured to receive two control signals 212, for example, to enable controller 208 to control a plurality of indication states, e.g., five indication states, of multicolor light source 204. In one example, control signals 212 may represent a 2-bit value having either a first value, e.g., to control multicolor light source 204 to be at an off state, a second value, e.g., to control multicolor light source 204 to emit green light, a third value, e.g., to control multicolor light source to emit yellow light, or a fourth value, e.g., to control multicolor light source 204 to emit red light.

In some demonstrative embodiments, controller 208 may control multicolor light source 204 to emit light continuously or intermittently. For example, controller 208 may control multicolor light source 204 to emit green light either continuously or intermittently.

In some demonstrative embodiments, control button 202 may be to provide to controller 208 an input signal 210, for example, to indicate a state of control button 202. For example, input signal 210 may include a 1-bit signal having either a first value, e.g., to indicate control button 202 is not being pressed, or a second value, e.g., to indicate control button is being pressed.

In some demonstrative embodiments, controller 208 may control multicolor light source 204 to provide an indication selected from a predefined set of five state indications state, e.g., as follows:

TABLE 1

| Docking Device (Dock) State | Multi-Color LED |
| --- | --- |
| Disconnected | Off |
| Connected | Green |
| Error (e.g., HW failure) | Red |
| "Ready to Connect (e.g., to indicate that pressing the control button will trigger a wireless docking connection) | Yellow |
| The Dock is undergoing firmware upgrade | Blinking green |

In some demonstrative embodiments, controller 208 may trigger one or more docking operations and/or control the indications of multicolor light source 204 according to the button state of control button 202 and a wireless docking state of the wireless docking device, e.g., as follows:

TABLE 2

| Functionality | Current System State | Dock Button Action | LED indications Before Button Press | LED indications After Button Press |
| --- | --- | --- | --- | --- |
| Pairing a Mobile device (Client device) to Dock, e.g., using a push-button pairing method | Mobile device active, Dock not-connected and not paired with this Mobile device | Short duration Press | Yellow (Ready to Connect) | Green (connected) |
| Triggering the mobile device to enter an Idle power state | Mobile device active, mobile device and Dock connected | Short duration Press | Green (connected) | Yellow (Ready to Connect) |
| Triggering the Mobile device to switch from idle power state to active state | Mobile device in idle power state, Mobile device and Dock are paired, and configured to auto-connect, and the Mobile device is within the docking physical range | Short duration Press | Yellow (ready to connect) | Green (Connected) |
| Disconnect the Mobile device from the dock (Undock) | Mobile device active, Dock connected | Long duration Press | Green (Connected) | Off (Disconnected) |
| Wakeup a display connected to the Dock, and present an on-screen-display (OSD) message | Dock not connected | Short duration Press | Off (Disconnected) | Off (Disconnected) |

Figure 3:
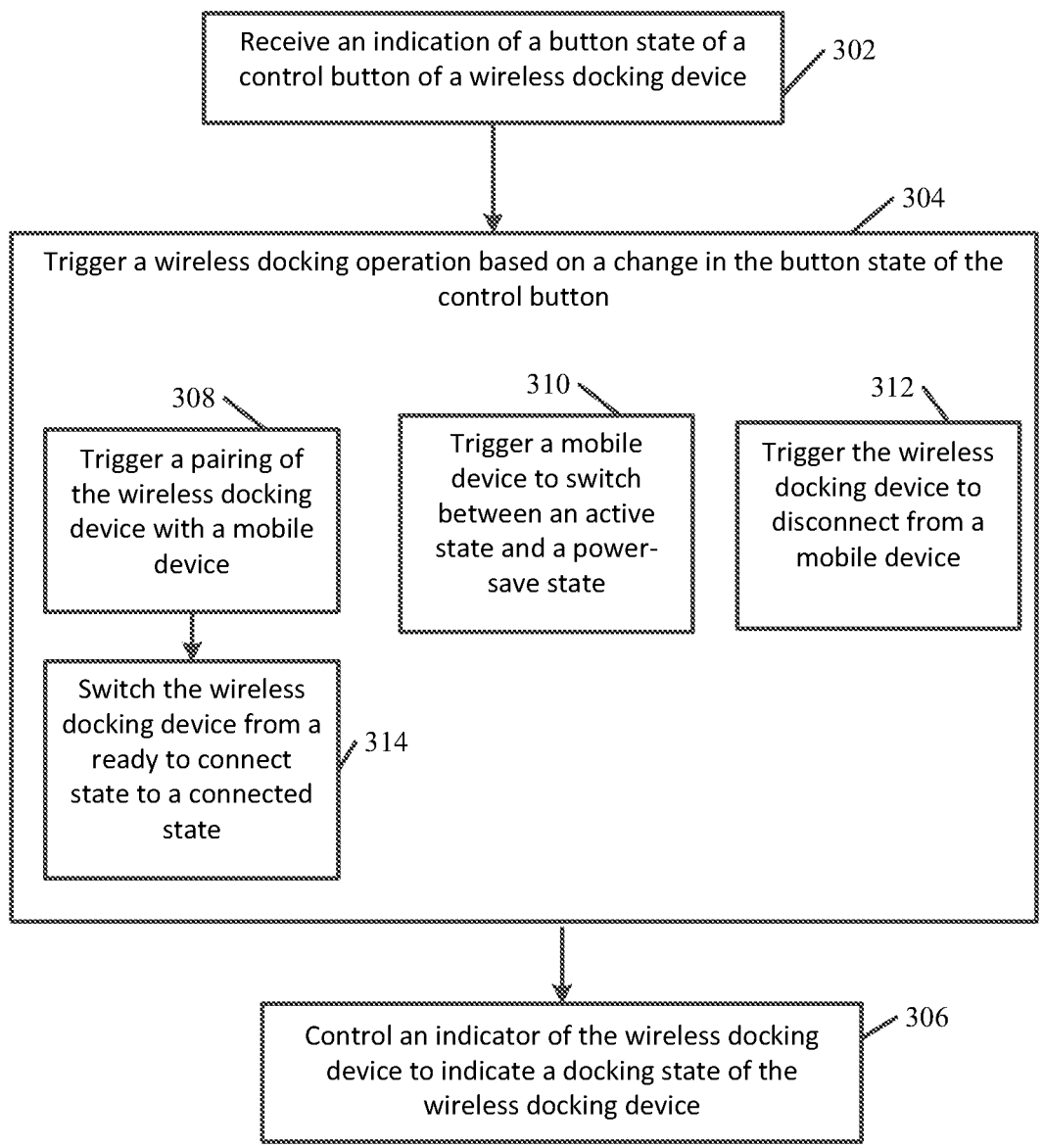
FIG. 3 is a schematic flow chart illustration of a method of controlling a wireless docking device, in accordance with some demonstrative embodiments.

Reference is now made to FIG. 3, which schematically illustrates a method of controlling a wireless docking device, in accordance with some demonstrative embodiments. For example, one or more of the operations of the method of FIG. 3 may be performed by a wireless communication system, e.g., system 100 (FIG. 1); a wireless docking device, e.g., wireless docking device 150 (FIG. 1); an interface, e.g., interface 156 (FIG. 1); and/or a controller, e.g., controller 151 (FIG. 1).

As indicated at block 302, the method may include receiving an indication of a button state of a control button of a wireless docking device. For example, controller 151 (FIG. 1) may receive the indication of the button state of control button 158 (FIG. 1) via input 153 (FIG. 1), e.g., as described above.

As indicated at block 304, the method may include triggering a wireless docking operation based on a change in the button state of the control button. For example, controller 151 (FIG. 1) may trigger the wireless docking operation based on a change in the button state of control button 158 (FIG. 1), e.g., as described above.

As indicated at block 308, the method may include triggering a pairing of the wireless docking device with a mobile device, e.g., responsive to the control button being pressed when the wireless docking device is at the ready to connect state, and the wireless docking device is not paired with the mobile device. For example, controller 151 (FIG. 1) may trigger the pairing between docking device 150 (FIG. 1) and mobile device 120 (FIG. 1), responsive to control button 158 (FIG. 1) being pressed when wireless docking device 150 (FIG. 1) is at the ready to connect state, and wireless docking device 150 (FIG. 1) and mobile device 120 (FIG. 1) are not paired, e.g., as described above.

As indicated at block 314, the method may include switching the wireless docking device from a ready to connect state to a connected state, e.g., responsive to the control button being pressed. For example, controller 151 (FIG. 1) may switch wireless docking device 150 (FIG. 1) from the ready to connect state to the connected state, responsive to control button 158 (FIG. 1) being pressed for the first duration, e.g., as described above.

As indicated at block 310, the method may include triggering a mobile device to switch between an active state and a power-save state, e.g., responsive to the control button being pressed. For example, controller 151 (FIG. 1) may trigger mobile device 120 (FIG. 1) to switch between the active state and the power-save state, e.g., responsive to control button 158 (FIG. 1) being pressed for the first duration, e.g., as described above.

As indicated at block 312, the method may include triggering the wireless docking device to disconnect from a mobile device, and to switch from the connected state to the disconnected state, e.g., responsive to the control button being pressed when the wireless docking device is at the connected state. For example, controller 151 (FIG. 1) may trigger wireless docking device 150 (FIG. 1) to disconnect from mobile device 120 (FIG. 1), and may switch wireless docking device 150 (FIG. 1) from the wireless docking connected state to the wireless docking disconnected state, e.g., responsive to control button 158 (FIG. 1) being pressed for the second duration, for example, if docking device 150 (FIG. 1) is at the wireless docking connected state, e.g., as described above.

As indicated at block 304, the method may include controlling an indicator of the wireless docking device to indicate a docking state of the wireless docking device. For example, controller 151 (FIG. 1) may control, indicator 157 (FIG. 1), e.g., via output 154 (FIG. 1), to indicate the docking state of wireless docking device 150 (FIG. 1), e.g., as described above.

Figure 4:
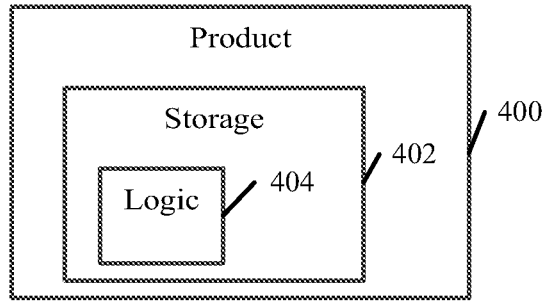
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible non-transitory machine-readable storage media 402 to store logic 404, which may be used, for example, to perform at least part of the wireless docking device 150 (FIG. 1), controller 151 (FIG. 1), control module 152 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage media 402 may include one or more types of computer-readable storage media capable of storing data, including volatile memory, non-volatile memory, removable or non-removable memory, erasable or non-erasable memory, writeable or re-writeable memory, and the like. For example, machine-readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless docking device comprising at least one indicator to indicate at least a wireless docking disconnected state, a ready to connect state, and a wireless docking connected state; a control button; and a controller to trigger a wireless docking operation based on a change in a button state of the control button, the wireless docking operation including an operation selected from the group consisting of pairing the wireless docking device with a mobile device, disconnecting the mobile device from the docking device, and triggering the mobile device to switch between first and second power states.

Example 2 includes the subject matter of Example 1, and optionally, wherein the controller is to trigger the pairing with the mobile device, responsive to the control button being pressed when the wireless docking device is at the ready to connect state and the wireless docking device is not paired with the mobile device.

Example 3 includes the subject matter of Example 2, and optionally, wherein the controller is to switch the wireless docking device from the ready to connect state to the wireless docking connected state.

Example 4 includes the subject matter of any one of Examples 1-3, and optionally, wherein the pairing with the mobile device comprises a Wireless Protected Setup (WPS) pairing, or a Pre-Shared-Key (PSK) passphrase pairing.

Example 5 includes the subject matter of any one of Examples 1-4, and optionally, wherein, responsive to the control button being pressed when the wireless docking device is at the wireless docking connected state, the controller is to trigger the mobile device to switch from an active state to a power-save state, and to switch the wireless docking device from the wireless docking connected state to the ready to connect state.

Example 6 includes the subject matter of any one of Examples 1-5, and optionally, wherein, responsive to the control button being pressed when the wireless docking device is at the wireless docking connected state, the controller is to disconnect the mobile device, and to switch from the wireless docking connected state to the wireless docking disconnected state.

Example 7 includes the subject matter of Example 6, and optionally, wherein the controller is to disconnect the mobile device responsive to the control button being pressed for a first duration when the wireless docking device is at the wireless docking connected state, and wherein, responsive to the control button being pressed for a second duration, different from the first duration, when the wireless docking device is at the wireless docking connected state, the controller is to trigger the mobile device to switch from an active state to a power-save state, and to switch the wireless docking device from the wireless docking connected state to the ready to connect state.

Example 8 includes the subject matter of Example 7, and optionally, wherein the second duration is shorter than the first duration.

Example 9 includes the subject matter of any one of Example 1-8, and optionally, wherein, responsive to the control button being pressed when the wireless docking device is at the ready to connect state and the wireless docking device is paired with the mobile device, the controller is to trigger the mobile device to switch from a power-save state to an active state, and to switch the wireless docking device from the ready to connect state to the wireless docking connected state.

Example 10 includes the subject matter of any one of Examples 1-9, and optionally, wherein, responsive to the control button being pressed when the wireless docking device is at the wireless docking disconnected state, the controller is to trigger a display device to display a docking message.

Example 11 includes the subject matter of any one of Examples 1-10, and optionally, wherein the indicator comprises a multi-color light source.

Example 12 includes the subject matter of Example 11, and optionally, wherein the multi-color light source comprises a multi-color Light-Emitting-Diode (LED).

Example 13 includes the subject matter of Example 11 or 12, and optionally, wherein the multi-color light source comprises a three-color light source.

Example 14 includes the subject matter of any one of Examples 11-13, and optionally, wherein the multi-color light source is to emit light of a first color at the ready to connect state, and to emit light of a second color, different from the first color, at the wireless docking connected state.

Example 15 includes the subject matter of Example 14, and optionally, wherein the multi-color light source is to emit light of a third color, different from the first and second colors, to indicate an error state at the wireless docking device.

Example 16 includes the subject matter of Example 14 or 15, and optionally, wherein the multi-color light source is to blink to indicate an update process being performed by the wireless docking device.

Example 17 includes the subject matter of any one of Examples 1-16, and optionally, comprising one or more antennas; and a radio to communicate with the mobile device.

Example 18 includes the subject matter of Example 17, and optionally, wherein the radio is to communicate with the mobile device via a Wireless-Fidelity (Wi-Fi) link.

Example 19 includes a wireless docking controller to control a wireless docking device, the wireless docking controller comprising an input to receive an input signal indicating a button state of a control button of the wireless docking device; an output to provide a control signal to an indicator of the wireless docking device; and a control module to control the indicator to indicate at least a wireless docking disconnected state, a ready to connect state, and a wireless docking connected state, and to trigger a wireless docking operation based on a change in the button state of the control button, the wireless docking operation including an operation selected from the group consisting of pairing the wireless docking device with a mobile device, disconnecting the mobile device from the wireless docking device, and triggering the mobile device to switch between first and second power states.

Example 20 includes the subject matter of Example 19, and optionally, wherein the wireless docking controller is to trigger the pairing with the mobile device, responsive to the control button being pressed when the wireless docking device is at the ready to connect state and the wireless docking device is not paired with the mobile device.

Example 21 includes the subject matter of Example 20, and optionally, wherein the wireless docking controller is to switch the wireless docking device from the ready to connect state to the wireless docking connected state.

Example 22 includes the subject matter of any one of Examples 19-21, and optionally, wherein the pairing with the mobile device comprises a Wireless Protected Setup (WPS) pairing, or a Pre-Shared-Key (PSK) passphrase pairing.

Example 23 includes the subject matter of any one of Examples 19-22, and optionally, wherein, responsive to the control button being pressed when the wireless docking device is at the wireless docking connected state, the wireless docking controller is to trigger the mobile device to switch from an active state to a power-save state, and to switch the wireless docking device from the wireless docking connected state to the ready to connect state.

Example 24 includes the subject matter of any one of Examples 19-23, and optionally, wherein, responsive to the control button being pressed when the wireless docking device is at the wireless docking connected state, the wireless docking controller is to disconnect the mobile device, and to switch the wireless docking device from the wireless docking connected state to the wireless docking disconnected state.

Example 25 includes the subject matter of Example 24, and optionally, wherein the wireless docking controller is to disconnect the mobile device responsive to the control button being pressed for a first duration when the wireless docking device is at the wireless docking connected state, and wherein, responsive to the control button being pressed for a second duration, different from the first duration, when the wireless docking device is at the wireless docking connected state, the wireless docking controller is to trigger the mobile device to switch from an active state to a power-save state, and to switch the wireless docking device from the wireless docking connected state to the ready to connect state.

Example 26 includes the subject matter of Example 25, and optionally, wherein the second duration is shorter than the first duration.

Example 27 includes the subject matter of any one of Examples 19-26, and optionally, wherein, responsive to the control button being pressed when the wireless docking device is at the ready to connect state and the wireless docking device is paired with the mobile device, the wireless docking controller is to trigger the mobile device to switch from a power-save state to an active state, and to switch the wireless docking device from the ready to connect state to the wireless docking connected state.

Example 28 includes the subject matter of any one of Examples 19-27, and optionally, wherein, responsive to the control button being pressed when the wireless docking device is at the wireless docking disconnected state, the wireless docking controller is to trigger a display device to display a docking message.

Example 29 includes the subject matter of any one of Examples 19-28, and optionally, wherein the indicator comprises a multi-color light source.

Example 30 includes the subject matter of Example 29, and optionally, wherein the multi-color light source comprises a multi-color Light-Emitting-Diode (LED).

Example 31 includes the subject matter of Example 29 or 30, and optionally, wherein the multi-color light source comprises a three-color light source.

Example 32 includes the subject matter of any one of Examples 29-31, and optionally, wherein the wireless docking controller is to control the multi-color light source to emit light of a first color at the ready to connect state, and to emit light of a second color, different from the first color, at the wireless docking connected state.

Example 33 includes the subject matter of Example 32, and optionally, wherein the wireless docking controller is to control the multi-color light source to emit light of a third color, different from the first and second colors, to indicate an error state at the wireless docking device.

Example 34 includes the subject matter of Example 32 or 33, and optionally, wherein the wireless docking controller is to control the multi-color light source to blink to indicate an update process being performed by the wireless docking device.

Example 35 includes a method comprising controlling an indicator of a wireless docking device to indicate at least a wireless docking disconnected state, a ready to connect state, and a wireless docking connected state; receiving an indication of a button state of a control button of the wireless docking device; and triggering a wireless docking operation based on a change in the button state of the control button, the wireless docking operation including an operation selected from the group consisting of pairing the wireless docking device with a mobile device, disconnecting the mobile device from the wireless docking device, and triggering the mobile device to switch between first and second power states.

Example 36 includes the subject matter of Example 35, and optionally, comprising triggering the pairing with the mobile device, responsive to the control button being pressed when the wireless docking device is at the ready to connect state and the wireless docking device is not paired with the mobile device.

Example 37 includes the subject matter of Example 36, and optionally, comprising switching the wireless docking device from the ready to connect state to the wireless docking connected state.

Example 38 includes the subject matter of any one of Examples 35-37, and optionally, wherein the pairing with the mobile device comprises a Wireless Protected Setup (WPS) pairing, or a Pre-Shared-Key (PSK) passphrase pairing.

Example 39 includes the subject matter of any one of Examples 35-38, and optionally, comprising, responsive to the control button being pressed when the wireless docking device is at the wireless docking connected state, triggering the mobile device to switch from an active state to a power-save state, and switching the wireless docking device from the wireless docking connected state to the ready to connect state.

Example 40 includes the subject matter of any one of Examples 35-39, and optionally, comprising, responsive to the control button being pressed when the wireless docking device is at the wireless docking connected state, disconnecting the mobile device, and switching from the wireless docking connected state to the wireless docking disconnected state.

Example 41 includes the subject matter of Example 40, and optionally, comprising disconnecting the mobile device, responsive to the control button being pressed for a first duration when the wireless docking device is at the wireless docking connected state; and responsive to the control button being pressed for a second duration, different from the first duration, when the wireless docking device is at the wireless docking connected state, triggering the mobile device to switch from an active state to a power-save state, and switching the wireless docking device from the wireless docking connected state to the ready to connect state.

Example 42 includes the subject matter of Example 41, and optionally, wherein the second duration is shorter than the first duration.

Example 43 includes the subject matter of any one of Examples 35-42, and optionally, comprising, responsive to the control button being pressed when the wireless docking device is at the ready to connect state and the wireless docking device is paired with the mobile device, triggering the mobile device to switch from a power-save state to an active state, and switching the wireless docking device from the ready to connect state to the wireless docking connected state.

Example 44 includes the subject matter of any one of Examples 35-43, and optionally, comprising, responsive to the control button being pressed when the wireless docking device is at the wireless docking disconnected state, triggering a display device to display a docking message.

Example 45 includes the subject matter of any one of Examples 35-44, and optionally, wherein the indicator comprises a multi-color light source.

Example 46 includes the subject matter of Example 45, and optionally, wherein the multi-color light source comprises a multi-color Light-Emitting-Diode (LED).

Example 47 includes the subject matter of Example 45 or 46, and optionally, wherein the multi-color light source comprises a three-color light source.

Example 48 includes the subject matter of any one of Examples 45-47, and optionally, comprising controlling the multi-color light source to emit light of a first color at the ready to connect state, and to emit light of a second color, different from the first color, at the wireless docking connected state.

Example 49 includes the subject matter of Example 48, and optionally, comprising controlling the multi-color light source to emit light of a third color, different from the first and second colors, to indicate an error state at the wireless docking device.

Example 50 includes the subject matter of Example 48 or 49, and optionally, comprising controlling the multi-color light source to blink to indicate an update process being performed by the wireless docking device.

Example 51 includes the subject matter of any one of Examples 35-50, and optionally, comprising communicating with the mobile device via a Wireless-Fidelity (Wi-Fi) link.

Example 52 includes a product including one or more tangible computer-readable non-transitory storage media comprising computer-executable instructions operable to, when executed by at least one computer processor, enable the at least one computer processor to implement a method comprising controlling an indicator of a wireless docking device to indicate at least a wireless docking disconnected state, a ready to connect state, and a wireless docking connected state; receiving an indication of a button state of a control button of the wireless docking device; and triggering a wireless docking operation based on a change in the button state of the control button, the wireless docking operation including an operation selected from the group consisting of pairing the wireless docking device with a mobile device, disconnecting the mobile device from the wireless docking device, and triggering the mobile device to switch between first and second power states.

Example 53 includes the subject matter of Example 52, and optionally, wherein the method comprises triggering the pairing with the mobile device, responsive to the control button being pressed when the wireless docking device is at the ready to connect state and the wireless docking device is not paired with the mobile device.

Example 54 includes the subject matter of Example 53, and optionally, wherein the method comprises switching the wireless docking device from the ready to connect state to the wireless docking connected state.

Example 55 includes the subject matter of any one of Examples 52-54, and optionally, wherein the pairing with the mobile device comprises a Wireless Protected Setup (WPS) pairing, or a Pre-Shared-Key (PSK) passphrase pairing.

Example 56 includes the subject matter of any one of Examples 52-55, and optionally, wherein the method comprises, responsive to the control button being pressed when the wireless docking device is at the wireless docking connected state, triggering the mobile device to switch from an active state to a power-save state, and switching the wireless docking device from the wireless docking connected state to the ready to connect state.

Example 57 includes the subject matter of any one of Examples 52-56, and optionally, wherein the method comprises, responsive to the control button being pressed when the wireless docking device is at the wireless docking connected state, disconnecting the mobile device, and switching from the wireless docking connected state to the wireless docking disconnected state.

Example 58 includes the subject matter of Example 57, and optionally, wherein the method comprises disconnecting the mobile device, responsive to the control button being pressed for a first duration when the wireless docking device is at the wireless docking connected state; and responsive to the control button being pressed for a second duration, different from the first duration, when the wireless docking device is at the wireless docking connected state, triggering the mobile device to switch from an active state to a power-save state, and switching the wireless docking device from the wireless docking connected state to the ready to connect state.

Example 59 includes the subject matter of Example 58, and optionally, wherein the second duration is shorter than the first duration.

Example 60 includes the subject matter of any one of Examples 52-59, and optionally, wherein the method comprises, responsive to the control button being pressed when the wireless docking device is at the ready to connect state and the wireless docking device is paired with the mobile device, triggering the mobile device to switch from a power-save state to an active state, and switching the wireless docking device from the ready to connect state to the wireless docking connected state.

Example 61 includes the subject matter of any one of Examples 52-60, and optionally, wherein the method comprises, responsive to the control button being pressed when the wireless docking device is at the wireless docking disconnected state, triggering a display device to display a docking message.

Example 62 includes the subject matter of any one of Examples 52-61, and optionally, wherein the indicator comprises a multi-color light source.

Example 63 includes the subject matter of Example 62, and optionally, wherein the multi-color light source comprises a multi-color Light-Emitting-Diode (LED).

Example 64 includes the subject matter of Example 62 or 63, and optionally, wherein the multi-color light source comprises a three-color light source.

Example 65 includes the subject matter of any one of Examples 62-64, and optionally, wherein the method comprises controlling the multi-color light source to emit light of a first color at the ready to connect state, and to emit light of a second color, different from the first color, at the wireless docking connected state.

Example 66 includes the subject matter of Example 65, and optionally, wherein the method comprises controlling the multi-color light source to emit light of a third color, different from the first and second colors, to indicate an error state at the wireless docking device.

Example 67 includes the subject matter of Example 65 or 66, and optionally, wherein the method comprises controlling the multi-color light source to blink to indicate an update process being performed by the wireless docking device.

Example 68 includes the subject matter of any one of Examples 52-67, and optionally, wherein the method comprises communicating with the mobile device via a Wireless-Fidelity (Wi-Fi) link.

Example 69 includes an apparatus comprising means for controlling an indicator of a wireless docking device to indicate at least a wireless docking disconnected state, a ready to connect state, and a wireless docking connected state; means for receiving an indication of a button state of a control button of the wireless docking device; and means for triggering a wireless docking operation based on a change in the button state of the control button, the wireless docking operation including an operation selected from the group consisting of pairing the wireless docking device with a mobile device, disconnecting the mobile device from the wireless docking device, and triggering the mobile device to switch between first and second power states.

Example 70 includes the subject matter of Example 69, and optionally, comprising means for triggering the pairing with the mobile device, responsive to the control button being pressed when the wireless docking device is at the ready to connect state and the wireless docking device is not paired with the mobile device.

Example 71 includes the subject matter of Example 70, and optionally, comprising means for switching the wireless docking device from the ready to connect state to the wireless docking connected state.

Example 72 includes the subject matter of any one of Examples 69-71, and optionally, wherein the pairing with the mobile device comprises a Wireless Protected Setup (WPS) pairing, or a Pre-Shared-Key (PSK) passphrase pairing.

Example 73 includes the subject matter of any one of Examples 69-72, and optionally, comprising means for, responsive to the control button being pressed when the wireless docking device is at the wireless docking connected state, triggering the mobile device to switch from an active state to a power-save state, and switching the wireless docking device from the wireless docking connected state to the ready to connect state.

Example 74 includes the subject matter of any one of Examples 69-73, and optionally, comprising means for, responsive to the control button being pressed when the wireless docking device is at the wireless docking connected state, disconnecting the mobile device, and switching from the wireless docking connected state to the wireless docking disconnected state.

Example 75 includes the subject matter of Example 74, and optionally, comprising means for disconnecting the mobile device, responsive to the control button being pressed for a first duration when the wireless docking device is at the wireless docking connected state; and means for, responsive to the control button being pressed for a second duration, different from the first duration, when the wireless docking device is at the wireless docking connected state, triggering the mobile device to switch from an active state to a power-save state, and switching the wireless docking device from the wireless docking connected state to the ready to connect state.

Example 76 includes the subject matter of Example 75, and optionally, wherein the second duration is shorter than the first duration.

Example 77 includes the subject matter of any one of Examples 69-76, and optionally, comprising means for, responsive to the control button being pressed when the wireless docking device is at the ready to connect state and the wireless docking device is paired with the mobile device, triggering the mobile device to switch from a power-save state to an active state, and switching the wireless docking device from the ready to connect state to the wireless docking connected state.

Example 78 includes the subject matter of any one of Examples 69-77, and optionally, comprising means for, responsive to the control button being pressed when the wireless docking device is at the wireless docking disconnected state, triggering a display device to display a docking message.

Example 79 includes the subject matter of any one of Examples 69-78, and optionally, wherein the indicator comprises a multi-color light source.

Example 80 includes the subject matter of Example 79, and optionally, wherein the multi-color light source comprises a multi-color Light-Emitting-Diode (LED).

Example 81 includes the subject matter of Example 79 or 80, and optionally, wherein the multi-color light source comprises a three-color light source.

Example 82 includes the subject matter of any one of Examples 79-81, and optionally, comprising means for controlling the multi-color light source to emit light of a first color at the ready to connect state, and to emit light of a second color, different from the first color, at the wireless docking connected state.

Example 83 includes the subject matter of Example 82, and optionally, comprising means for controlling the multi-color light source to emit light of a third color, different from the first and second colors, to indicate an error state at the wireless docking device.

Example 84 includes the subject matter of Example 82 or 83, and optionally, comprising means for controlling the multi-color light source to blink to indicate an update process being performed by the wireless docking device.

Example 85 includes the subject matter of any one of Examples 69-84, and optionally, comprising means for communicating with the mobile device via a Wireless-Fidelity (Wi-Fi) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless docking device comprising:
   at least one indicator to indicate at least a wireless docking disconnected state, a ready to connect state, and a wireless docking connected state;
   a control button; and
   a controller to trigger a wireless docking operation based on a change in a button state of said control button, the wireless docking operation including an operation selected from the group consisting of pairing said wireless docking device with a mobile device, disconnecting said mobile device from said docking device, and triggering said mobile device to switch between first and second power states.

2. The wireless docking device of claim 1, wherein said controller is to trigger the pairing with said mobile device, responsive to said control button being pressed when said wireless docking device is at said ready to connect state and said wireless docking device is not paired with said mobile device.

3. The wireless docking device of claim 2, wherein said controller is to switch said wireless docking device from said ready to connect state to said wireless docking connected state.

4. The wireless docking device of claim 1, wherein, responsive to said control button being pressed when said wireless docking device is at said wireless docking connected state, said controller is to trigger the mobile device to switch from an active state to a power-save state, and to switch said wireless docking device from said wireless docking connected state to said ready to connect state.

5. The wireless docking device of claim 1, wherein, responsive to said control button being pressed when said wireless docking device is at said wireless docking connected state, said controller is to disconnect the mobile device, and to switch from said wireless docking connected state to said wireless docking disconnected state.

6. The wireless docking device of claim 5, wherein said controller is to disconnect the mobile device responsive to said control button being pressed for a first duration when said wireless docking device is at said wireless docking connected state,
   and wherein, responsive to said control button being pressed for a second duration, different from said first duration, when said wireless docking device is at said wireless docking connected state, said controller is to trigger the mobile device to switch from an active state to a power-save state, and to switch said wireless docking device from said wireless docking connected state to said ready to connect state.

7. The wireless docking device of claim 1, wherein, responsive to said control button being pressed when said wireless docking device is at said ready to connect state and said wireless docking device is paired with said mobile device, said controller is to trigger the mobile device to switch from a power-save state to an active state, and to switch said wireless docking device from said ready to connect state to said wireless docking connected state.

8. The wireless docking device of claim 1, wherein, responsive to said control button being pressed when said wireless docking device is at said wireless docking disconnected state, said controller is to trigger a display device to display a docking message.

9. The wireless docking device of claim 1, wherein said indicator comprises a multi-color light source.

10. The wireless docking device of claim 9, wherein said multi-color light source comprises a multi-color Light-Emitting-Diode (LED).

11. The wireless docking device of claim 9, wherein the multi-color light source comprises a three-color light source.

12. The wireless docking device of claim 9, wherein the multi-color light source is to emit light of a first color at said ready to connect state, and to emit light of a second color, different from said first color, at the wireless docking connected state.

13. The wireless docking device of claim 1 comprising:
one or more antennas; and
a radio to communicate with said mobile device.

14. The wireless docking device of claim 13, wherein the radio is to communicate with said mobile device via a Wireless-Fidelity (Wi-Fi) link.

15. A wireless docking controller to control a wireless docking device, the wireless docking controller comprising:
an input to receive an input signal indicating a button state of a control button of said wireless docking device;
an output to provide a control signal to an indicator of said wireless docking device; and
a control module to control said indicator to indicate at least a wireless docking disconnected state, a ready to connect state, and a wireless docking connected state, and to trigger a wireless docking operation based on a change in the button state of said control button, the wireless docking operation including an operation selected from the group consisting of pairing said wireless docking device with a mobile device, disconnecting said mobile device from said wireless docking device, and triggering said mobile device to switch between first and second power states.

16. The wireless docking controller of claim 15, wherein, responsive to said control button being pressed when said wireless docking device is at said wireless docking connected state, said wireless docking controller is to trigger the mobile device to switch from an active state to a power-save state, and to switch said wireless docking device from said wireless docking connected state to said ready to connect state.

17. The wireless docking controller of claim 15, wherein, responsive to said control button being pressed when said wireless docking device is at said wireless docking connected state, said wireless docking controller is to disconnect the mobile device, and to switch said wireless docking device from said wireless docking connected state to said wireless docking disconnected state.

18. The wireless docking controller of claim 15, wherein said indicator comprises a multi-color light source.

19. A method comprising:
controlling an indicator of a wireless docking device to indicate at least a wireless docking disconnected state, a ready to connect state, and a wireless docking connected state;
receiving an indication of a button state of a control button of said wireless docking device; and
triggering a wireless docking operation based on a change in the button state of said control button, the wireless docking operation including an operation selected from the group consisting of pairing said wireless docking device with a mobile device, disconnecting said mobile device from said wireless docking device, and triggering said mobile device to switch between first and second power states.

20. The method of claim 19 comprising triggering the pairing with said mobile device, responsive to said control button being pressed when said wireless docking device is at said ready to connect state and said wireless docking device is not paired with said mobile device.

21. A product including one or more tangible computer-readable non-transitory storage media comprising computer-executable instructions operable to, when executed by at least one computer processor, enable the at least one computer processor to implement a method comprising:
controlling an indicator of a wireless docking device to indicate at least a wireless docking disconnected state, a ready to connect state, and a wireless docking connected state;
receiving an indication of a button state of a control button of said wireless docking device; and
triggering a wireless docking operation based on a change in the button state of said control button, the wireless docking operation including an operation selected from the group consisting of pairing said wireless docking device with a mobile device, disconnecting said mobile device from said wireless docking device, and triggering said mobile device to switch between first and second power states.

22. The product of claim 21, wherein said method comprises triggering the pairing with said mobile device, responsive to said control button being pressed when said wireless docking device is at said ready to connect state and said wireless docking device is not paired with said mobile device.

23. The product of claim 21, wherein said method comprises, responsive to said control button being pressed when said wireless docking device is at said wireless docking connected state, triggering the mobile device to switch from an active state to a power-save state, and switching said wireless docking device from said wireless docking connected state to said ready to connect state.

24. The product of claim 21, wherein said method comprises, responsive to said control button being pressed when said wireless docking device is at said wireless docking connected state, disconnecting the mobile device, and switching from said wireless docking connected state to said wireless docking disconnected state.

25. The product of claim 24, wherein said method comprises:
disconnecting the mobile device, responsive to said control button being pressed for a first duration when said wireless docking device is at said wireless docking connected state; and
responsive to said control button being pressed for a second duration, different from said first duration, when said wireless docking device is at said wireless docking connected state, triggering the mobile device to switch from an active state to a power-save state, and switching said wireless docking device from said wireless docking connected state to said ready to connect state.

* * * * *